United States Patent [19]
Kasiewicz et al.

[11] 3,940,657
[45] Feb. 24, 1976

[54] INTEGRATED CIRCUIT FLASHER

[76] Inventors: Stanley J. Kasiewicz, 29852 Springhill Drive, Southfield, Mich. 48076; Earl Richard McIntyre, 4153 Hardwoods Drive, Orchard Lake, Mich. 48033

[22] Filed: Jan. 27, 1975

[21] Appl. No.: 544,243

[52] U.S. Cl. .............. 315/77; 315/200 A; 315/217; 315/225; 340/81 R
[51] Int. Cl.² .......................................... B60Q 1/42
[58] Field of Search ......... 315/77, 200 A, 217, 225; 340/81 R, 81 F; 331/108 C, 108 D, 75

[56] References Cited

UNITED STATES PATENTS 3,771,019  11/1973  Bolinger.......................... 315/200 A Primary Examiner—James B. Mullins
Attorney, Agent, or Firm—Reising, Ethington, Barnard, Perry and Brooks

[57] ABSTRACT

A flasher circuit is disclosed for use with a conventional automotive turn signal system. The flasher circuit comprises a flasher relay under the control of a free-running multivibrator. The multivibrator takes the form of a pair of intercoupled logic gates and an inhibiting means, in the form of a logic gate, disables the multivibrator when the turn signal switch is open and enables it so long as the turn signal switch is closed. The inhibiting logic gate is supplied with logic signals from the output of the multivibrator and a voltage sensing circuit connected with the turn signal switch. The flasher circuit is a two-terminal device and may be substituted for the well known hot-wire flasher without the circuit changes in the turn signal system. The logic gates preferably take the form of an integrated circuit on a single chip.

10 Claims, 5 Drawing Figures

INTEGRATED CIRCUIT FLASHER

This invention relates to flasher circuits and, more particularly, it relates to an oscillator controlled flasher circuit for use in automotive turn signals.

BACKGROUND OF THE INVENTION

Automotive turn signals, in commercial usage, have most commonly employed a flasher unit or stage of the hot-wire type. This type of flasher unit probably is the predominant type in current usage. The conventional automotive turn signal circuit comprises a turn signal switch which is manually actuated to selectively energize the right-hand or left-hand turn signal lamps from the battery through the circuit of the flasher. The flasher, whatever its form, is operative to intermittently connect the turn signal lamps across the battery.

The conventional automotive turn signal circuit includes a series connection of the turn signal switch, flasher contacts or switch, and the selected lamps across the battery. In this conventional circuit the turn signal switch is electrically connected between the flasher switch and the lamps. This order of arrangement, whatever the reasons, has become standardized and, as a practical matter, is of significance in developing new flasher circuits, as will appear subsequently.

As mentioned above, the hot-wire flasher was used almost universally for a period of time; in more recent years, electronic flashers using oscillator controlled flasher switches have come into use. A large number of oscillator controlled flasher circuits have been devised in the prior art, most of them employing transistorized oscillators which control a flasher switch in the form of either a power transistor or a flasher relay. In order for an oscillataor controlled flasher to be useful in the conventional automotive turn signal circuit it must start oscillation when the turn signal switch is closed and stop oscillation when it is opened. The difficulty with this requirement arises from the fact that the order of arrangement of the flasher switch and turn signal switch in the conventional turn signal circuit precludes the straightforward use of the voltage at the turn signal switch from being used as a turn-on and turn-off signal for the oscillator. With the turn signal switch in its conventional location between the flasher switch and load, the voltage at the turn signal switch is intermittently high and low in synchronism with the closing and opening of the flasher switch so long as the turn signal switch is closed. Thus, the turn signal switch produces an ambiguous signal voltage rather than a signal voltage which unequivocally signifies whether the turn signal switch is open or closed, such as a low voltage when the turn signal switch is open and a high voltage when it is closed as would be the case if the turn signal switch and flasher switch are positionally interchanged in the circuit.

The hot-wire flasher which has had such widespread use is basically a two-terminal device, i.e., it has one terminal for connection to the supply voltage and another terminal for connection to the load, the return circuit to the supply voltage source being through the load itself. (Some flashers include a third terminal for connection of a pilot lamp, such auxiliary terminals not being counted in the basic requirement.) The conventional turn signal circuit thus is adapted to receive a flasher by a two-terminal connection.

The problem, stated simply, of adapting an oscillator controlled flasher to the conventional turn signal circuit is that of connecting the flasher into the circuit with two terminals and turning the flasher on or off by closing and opening the turn signal switch. A solution would allow an oscillator controlled flasher to be substituted directly for a hot-wire flasher without any circuit changes; further, the oscillator would be off except when the turn signal switch is actuated, thereby eliminating the mechanical cycling of the relay that would cause premature wear.

The prior art includes several different oscillator controlled flashers. One such flasher is disclosed in the Grontkowski U.S. Pat. No. 3,002,127 wherein a multivibrator is used for periodically actuating a flasher relay. In the system of this patent the multivibrator is started by closing the turn signal switch, with the supply voltage being connected through the turn signal switch and the flasher relay contacts; to keep the multivibrator running when the flasher relay contacts open, an auxiliary contact is provided on the flasher relay along with steering diodes to provide supply voltage to the multivibrator.

Another prior art multivibrator controlled flasher is disclosed in the Domann et al U.S. Pat. No. 3,329,868. In this patented flasher the multivibrator is held in an energized but non-oscillating state even when the turn signal switch is in the neutral or open position. When the turn signal switch is closed a separate transistor stage is turned on and enables the multivibrator to start oscillation.

There are other examples of multivibrator controlled flashers which are provided with some form of oscillator on and off control by means of a turn signal switch. The Ivec U.S. Pat. No. 3,478,248 discloses a multivibrator controlled flasher in which the output stage of the multivibrator has a DC path only through a turn signal switch and hence oscillations cannot start until the switch is closed. In the Roberts U.S. Pat. No. 3,576,444 the output stage of the multivibrator receives initial base drive upon closure of the turn signal switch and then oscillation is sustained by subsequent supply of base drive from a storage capacitor. In the Schorter U.S. Pat. No. 3,824,542 the starting and sustaining of oscillations in the multivibrator by closure of the turn signal switch is provided by a special relay having voltage and current coils, together with a special capacitor and diode circuit.

The subject invention provides a multivibrator controlled flasher circuit especially adapted for a conventional automotive turn signal system. The flasher is turned off and on by the turn signal switch and is basically a two-terminal device so that it can be used in the same circuit as a hot-wire flasher without requiring circuit change. Additionally, the inventive circuit may be implemented with standard integrated circuits and constructed as a plug-in module.

The invention comprises a free-running multivibrator adapted to oscillate when an enabling signal is applied thereto; an enabling means applies the enabling signal only when the voltage at the multivibrator output and the voltage at the turn signal switch are in a predetermined state relative to each other. The multivibrator comprises first and second logic gates and the enabling means is also a logic gate. The gate of the enabling means has one input connected with the multivibrator output and another input connected with the turn signal switch through a logic voltage circuit. The logic gates may be either NAND gates or NOR gates and the invention is useful in either a negative or positive ground automotive electrical system.

DETAILED DESCRIPTION

A more complete understand of the invention may be obtained from the detailed description that follows, taken with the accompanying drawings in which.

Figure 1:
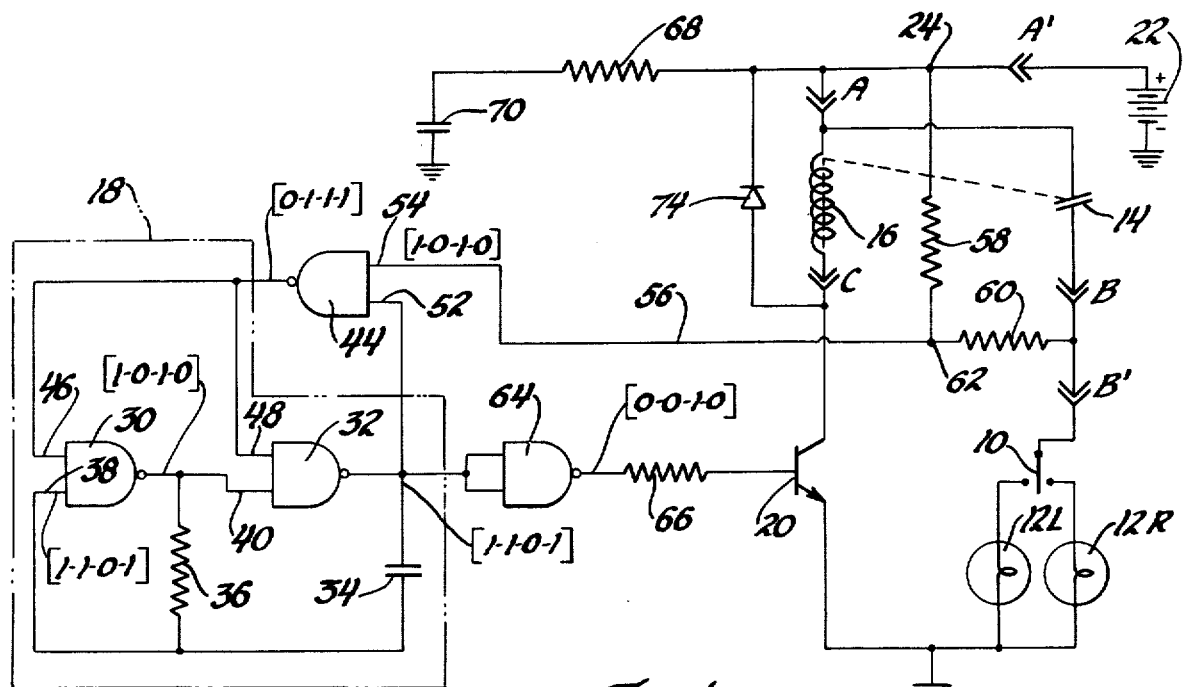
FIG. 1 is a circuit diagram of the invention in a negative ground, NAND logic circuit.

Referring now to the drawings, there is shown an illustrative embodiment of the invention in a flasher circuit especially adapted for use in an automotive turn signal system.

The circuit of FIG. 1 shows an embodiment of the invention for use in an automotive electrical system having a negative ground. The turn signal system comprises, in general, a turn signal switch 10, turn signal lamps 12L and 12R, a flasher relay including a flasher switch 14 and a relay coil 16, and a control circuit according to the present invention. The control circuit includes an astable or free-running multivibrator 18 which controls a driver transistor 20 for selectively energizing the coil 16 of the flasher relay. The circuit is energized from a voltage source 22, specifically the vehicle battery, which has its positive terminal connected with a supply voltage terminal 24 and its negative terminal connected to ground, i.e., point of common reference potential.

Considering the turn signal circuit in greater detail, it is noted that the flasher switch 14, the turn signal switch 10, and the load (either lamp 12L or lamp 12R) are connected, in the order named, across the battery 22. The turn signal switch 10 is of conventional construction and is a manually actuated switch with three positions, namely, a neutral position, a left-turn position, and a right-turn position. In the neutral position, as shown in FIG. 1, the switch is open and in the left-turn and right-turn positions, the switch is closed through separate fixed contacts which are connected respectively to the left turn signal lamp 12L and the right turn signal lamp 12R. The flasher relay is also of conventional construction with the flasher switch 14 being a set of single pole contacts actuable by the relay coil 16. The flasher relay, being an electrically actuated switch means, could be replaced by other such switch means such as a power transistor.

The turn signal circuit thus far described is of conventional arrangement. The turn signal lamps are inactive so long as the turn signal switch 10 is in the neutral position. When a turn is to be signaled by the operator, the switch 10 is manually actuated to the left turn or right turn position to close the turn signal switch 10. The selected lamp is intermittently energized or flashed by the intermittent closure of the flasher switch 14 of the flasher relay. The flasher relay is intermittently energized by the inventive control circuit which is now to be described.

The control circuit, as mentioned above, includes the free-running multivibrator 18 and a driver transistor 20; it also includes logic means for causing the multivibrator to run only so long as the turn signal switch is closed. The multivibrator 18 comprises NAND gate 30 and NAND gate 32 which are intercoupled through a time constant circuit including a capacitor 34 and a resistor 36. The capacitor 34 and resistor 36 are connected, in the order named, between the output of the NAND gate 32 and the output of the NAND gate 30. The junction of the capacitor 34 and resistor 36 is connected to input 38 of NAND gate 30 and the output of this NAND gate is connected directly to the input 40 of the NAND gate 32.

In order to selectively enable or disable the multivibrator 18 in accordance with the condition of the turn signal switch, inhibiting means are provided in the form of a NAND gate 44. This NAND gate has its output connected to another input 46 of gate 30 and another input 48 of gate 32. The NAND gate 44 has one input 52 connected with the output of the NAND gate 32 and it has another input 54 connected with a condition sensing circuit through a sense line 56. The sensing circuit comprises a pair of voltage divider resistors 58 and 60 connected in series between the supply voltage terminal 24 and the junction of flasher switch 14 and turn signal switch 10. The resistor 58 has a resistance value which is much greater than the combined resistance value of resistor 60 and the load. The resistor 58, for example, may be on the order of 1 megohm and approximately 10 times as large as resistor 60. The sense line 56 is connected to the junction 62 of the voltage divider resistors 58 and 60.

In order that the multivibrator 18 may control the flasher relay, the output of the NAND gate 32 is coupled to the input of the driver transistor 20. This coupling is provided through an inverter NAND gate 64 which has both inputs thereof connected with the output of gate 32 which constitutes the multivibrator output. The output of the NAND gate 64 is connected through a resistor 66 to the base of the transistor 20. The transistor 20 is an NPN transistor with the output, i.e., collector and emitter, being connected in series with the relay coil 16 across the battery 22.

The control circuit, as shown, also includes a filter network comprising a resistor 68 and a capacitor 70 to eliminate any high voltage transients which may appear at the supply voltage terminal. A diode 74 is connected across the relay coil 16 to reduce the inductive kick voltage which results from switching of the coil current.

The control circuit just described is preferably fabricated with the NAND gates 30, 32, 44 and 64 in the form of integrated circuits. This portion of the control circuit suitably takes the form of a single integrated circuit chip such as the quad 2 input NAND gate model MM 74C00N sold by National Semiconductor Company. The remaining elements of the control circuit including the resistors, capacitors, diode and transistor are external discrete devices mounted on a printed circuit board along with the integrated circuit chip for interconnection therewith.

Figure 3:
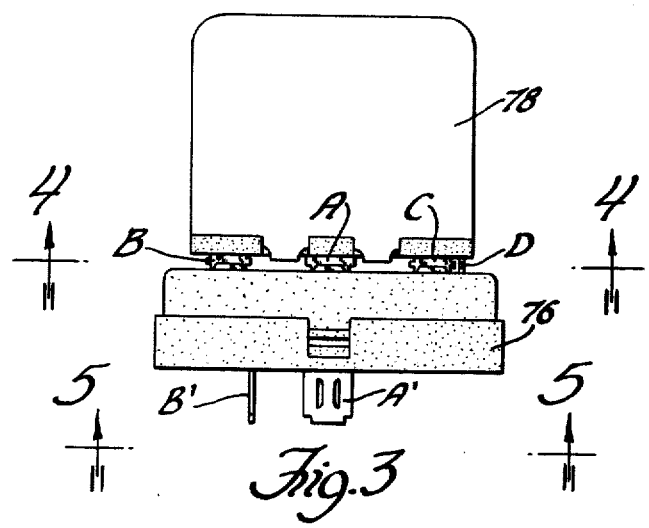
FIG. 3 is a side view of a complete flasher module.
Figure 4:
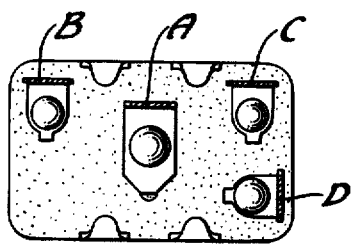
FIG. 4 is a bottom view of the flasher relay module taken on line 4—4 of FIG. 3.
Figure 5:
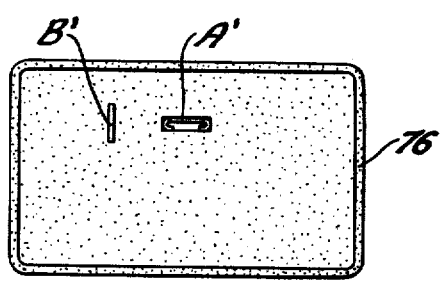
FIG. 5 is a bottom view of the flasher electronics module taken on line 5—5 of FIG. 3.

The entire control circuit is contained in a control circuit module 76 of the plug-in type as illustrated in FIGS. 3 and 5. The flasher relay comprising flasher switch 14 and coil 16 is contained within a relay module 78 of the plug-in type as shown in FIGS. 3 and 4. The relay module 78 plugs into and rides "piggy-back" on the control circuit module 76 as shown in FIG. 3. The flasher relay circuit and the control circuit are interconnected by four terminals A, B, C and D which are shown structurally in FIGS. 3 and 4. Terminals A, B and C are shown schematically in FIG. 1 whereas terminals D connects a ground point on the relay module to the various ground points shown in FIG. 1. Terminal A on the relay module is electrically connected with a terminal A' on the control circuit module. The terminal A' is shown structurally in FIG. 5 and is shown schematically in FIG. 1 and is connected with the positive terminal of the battery 22. The terminal B on the relay module is electrically connected with a terminal B' on the control circuit module. Terminal B' is shown structurally in FIG. 5 and is shown schematically in FIG. 1. This terminal connects the control circuit module and the relay module to the turn signal switch 10. Thus, it is seen from FIGS. 1, 3, 4 and 5 that the flasher circuit (including the flasher relay and control circuit) is connected into the turn signal circuit by only two terminals, namely terminal A' and terminal B'.

The operation of the inventive circuit will now be described with reference to FIG. 1. As described above, the flasher control circuit comprises certain logic circuits and the operation is based upon digital logic. For the purpose of explaining the digital logic, the conventional binary terminology of "logical high" and "logical low" will be used along with the respective notations of 1 and 0. The binary notation of 1 and 0 is used in the drawings at selected circuit points to show the sequence of logical states of that circuit point. These "state sequence indicators" are contained within brackets as, for example, ( 1 - 0-1-0) which pertains to the input 54 of the inhibit gate 44. Each state sequence indicator has four binary notations in four successive positions which are to be read from left to right as an indicator of the time sequential change of state for the indicated circuit point. The binary notations in the first positions in all state sequence indicators will be referred to as the first set, the binary notations in the second position will be referred to as the second set, and so forth for the four different positions. Thus, a first set of binary notations indicates the logical state of the several circuit points at a given time, the second set indicates the logical state at a subsequent time and so forth. The logic voltage levels, i.e., the logical high and the logical low, are established with reference to the supply voltage from the battery 22. The logic gates are supplied with the battery voltage in a conventional manner (supply voltage circuits not shown) and the logical high voltage is established at more than one half of the supply voltage while the logical low is established at less than one half the supply voltage.

With the turn signal switch 10 in the neutral position the voltage at the junction 62 of the voltage divider resistors 58 and 60 is at a logical high; hence the input 54 of the inhibit gate 44 is high. Also, with the turn signal switch in neutral, as will appear later, the output of the NAND gate 32 is at a logical high. Accordingly, the input 52 of the inhibit gate 44 is also high and since both inputs are high the output is low. The output of the inhibit gate 44 is applied to the input 46 of gate 30 and the input 48 of gate 32. This low input to the gates 30 and 32 of the multivibrator inhibits oscillation since it causes both gates 30 and 32 to produce a high output which, in effect, places zero voltage across the series connected capacitor 34 and resistor 36 of the timing circuit. This, of course, causes the input 38 of the gate 30 to be at a logical high and, as stated above, the output of gate 32 is at a logical high. In this circuit condition, i.e., with the turn signal switch 10 open, the multivibrator output is at a logical high and this output is applied through the inverter gate 64 which applies a logical low voltage to the base of the driver transistor 20 holding the transistor 20 nonconductive or off. Thus the flasher relay is not actuated and the flasher switch 14 is open. The flasher circuit is therefore inactive so long as the turn signal switch 10 is in the neutral or open position. The logical states of the designated circuit points, with the turn signal switch in the neutral position, are indicated by the binary notations in the first positions of the state sequence indicators.

When the turn signal switch 10 is closed in either its left turn or its right turn position, the voltage at junction 62 between the voltage divider resistors 58 and 60 becomes a logical low voltage and this is applied through the signal line 56 to the input 54 of the inhibit gate 44. The input 52 of this gate remains at a logical high for the time being and hence the output of the inhibit gate 44 switches to a logical high. Consequently, both inputs of gate 30 in the multivibrator are at logical high and the output thereof changes to a logical low. Thus, the input 40 of gate 32 is at logical low while input 48 thereof is at logical high; consequently the output of the gate 32 and hence the multivibrator, remains at a logical high for the time being. However, this change of state of the gate 30 of the multivibrator causes a voltage to be applied across the timing circuit, i.e., one side of the capacitor 34 is at a logical high and the opposite end of the resistor 36 is at logical low. Accordingly, the capacitor 34 starts to charge and, as the charge level increases, the voltage across the resistor 36 decreases; when the voltage at the junction of the resistor 36 and capacitor 34 diminishes sufficiently (below one half of the supply voltage) it becomes a logical low. Prior to this point in time the logical states of the several circuit points were indicated by the second set of binary notations in the state sequence indicators. After this point in time the logical states of the various circuit points are indicated by the third set of binary notations. Thus the input 38 of gate 30 is a logical low while the input 46 remains at a logical high. Accordingly, the output of gate 30 becomes a logical high and this causes the gate 32 to change state and produce an output of a logical low. As a result the output of the inverter gate 64 becomes logical high and this causes the driver transistor 20 to conduct. Consequently the relay coil 16 is energized and the flasher switch 14 is closed. With the flasher switch closed the battery voltage is applied through the flasher switch and the turn signal switch to the selected turn signal lamp 12L or 12R. This causes the junction point 62 to change to a logical high. Thus the input 54 of the inhibit gate 44 changes to a logical high at the same time that the input 52 of the inhibit gate changes to a logical low. This maintains the output of the inhibit gate 44 at a logical high and the multivibrator continues to be enabled to oscillate. In this condition, i.e., with the flasher switch 14 closed and the turn signal lamp illuminated, the logical state of the various circuit points is indicated by the third set of binary notations in the state sequence indicators.

In the logical state just described, with the multivibrator output at a logical low, the output of the gate 30 is at a logical high. Therefore the capacitor 34 starts to discharge in the opposite direction so that the voltage at the input 38 of the gate 30 increases from the logical low toward a logical high. When the logical high at input 38 is reached the output of the multivibrator changes to a logical high and the driver transistor 20 is turned off. This deenergizes the relay coil 16 and the flasher switch 14 opens and turns off the flasher lamp. This completes one cycle of flasher circuit operation and the logical state of the various circuit points is indicated by the fourth set of binary notations in the state sequence indicators. The multivibrator will continue to run and the flasher cycle will be repeated so long as the turn signal switch 10 remains closed, in either the left turn or the right turn positions. As soon as the turn signal switch 10 is restored to its neutral or open position the voltage at junction 62 goes to logical high and as soon as the multivibrator output also goes to logical high the inhibit gate 44 will produce a logical low output. With this logical low output applied to the inputs of gates 46 and 48 of the gates 30 and 32 the multivibrator is disabled and will remain disabled until the flasher switch 10 is closed.

Figure 2:
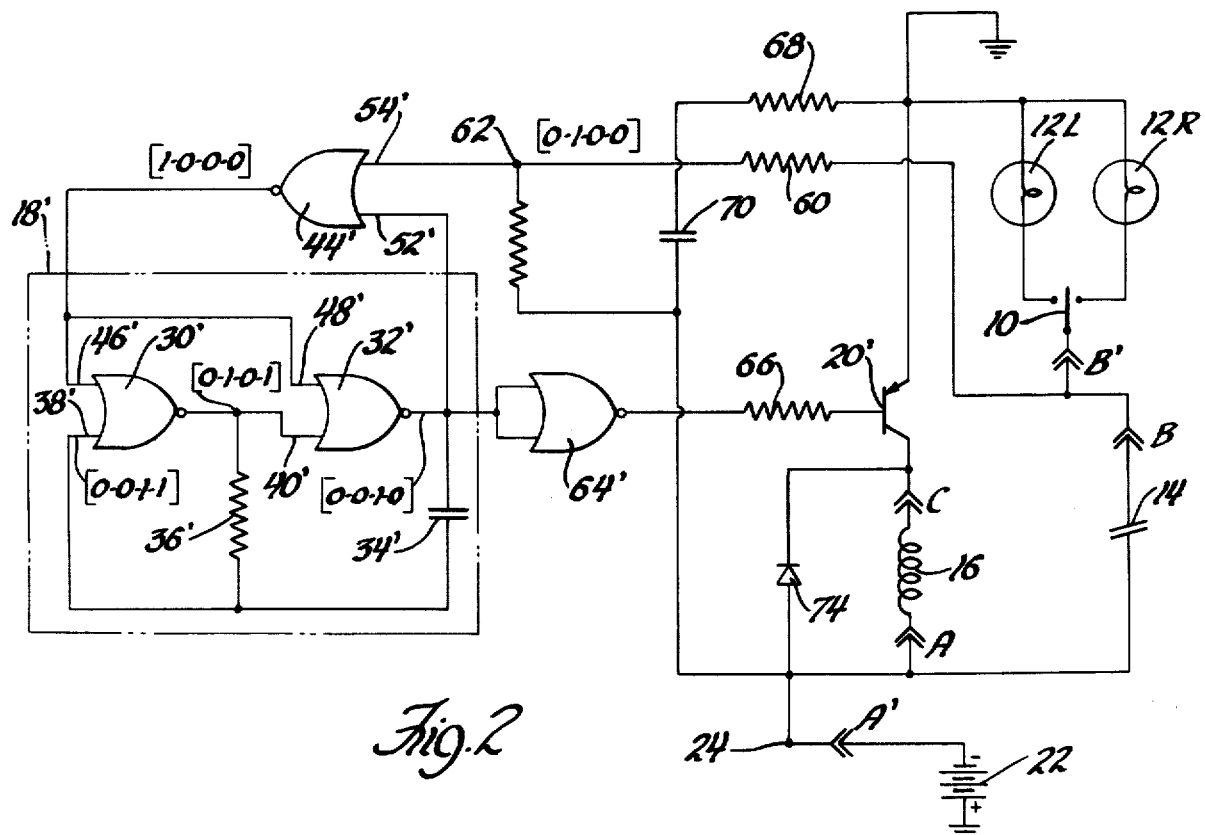
FIG. 2 is a circuit diagram of a positive ground, NOR logic circuit.

Another embodiment of the invention is shown in FIG. 2. This embodiment differs from the embodiment of FIG. 1 in that it is adpated for a positive ground electrical system and, although the operating principle is the same as the embodiment of FIG. 1, some circuit changes are required. Where the components in the embodiment of FIG. 2 are the same as the corresponding components in the embodiment of FIG. 1, the same reference characters are used. Where there is a difference between corresponding components, the same reference numeral as used in FIG. 1 is used with a prime symbol in FIG. 2.

As shown in FIG. 2, the turn signal lamp, in the positive ground system, is connected to the positive side of the battery. Consequently, a NOR logic is utilized in place of a NAND logic of the embodiment of FIG. 1. The multivibrator 18' comprises NOR gates 30' and 32' and the inhibiting means comprises a NOR gate 44'. Additionally, the output of the multivibrator 18' is applied through a NOR gate 64' to a driver transistor 20' which is a PNP transistor. The logic gates are preferably integrated circuits and preferably on a single chip such as the quad two-input NOR gate model MM 74C02N available from the National Semiconductor Company. The other circuit components in the embodiment of FIG. 2 are the same as those in the embodiment of FIG. 1.

The operation of the circuit of FIG. 2 is completely analogous to that of the circuit of FIG. 1 and will be summarized briefly. With the turn signal switch 10 in the neutral position the voltage at the junction 62 of the voltage divider resistors 58 and 60 is at a logical low and this is applied to the input 54' of the inhibit NOR gate 44'. The other input 52' of this NOR gate is at a logical low and hence the output of the NOR gate 44' is at a logical high. This output is applied to the inputs 46' and 48' of the gates 30' and 32' and inhibits the multivibrator from running. In this state, as indicated by the state sequence indicators the output of the multivibrator taken from the gate 32' is at logical low and hence the input to the transistor 20' is at logical high. This holds the transistor off and the flasher relay is deenergized with the flasher switch 14 open. With the turn signal switch 10 closed to either the left turn or right turn position the voltage at the junction 62 is at logical high and hence the output of the gate 44' is at logical low. This enables the oscillator 18' and the output thereof remains at logical low for the first half cycle. When the capacitor 34 is sufficiently charged the input 38' of gate 30' changes to logical high and the output of the multivibrator changes to a logical high.

This causes a logical low voltage to be applied to the base of the transistor 20' and the transistor is turned on to energize the relay coil 16. As a result, the flasher switch 14 is closed and the turn signal lamp is energized. This causes the voltage at junction 62, and hence at the input 54' of the inhibit gate 44', to go to logical low; at the same time the output of the multivibrator from gate 32' is at logical high and is applied to the input 52' of the gate 44'. Accordingly, the output of the inhibit gate 44' remains at logical low and hence the multivibrator remains enabled. This completes the second half cycle of the multivibrator and the flasher circuit operation. With the logic state as indicated by the third set of binary notations in the state sequence indicators the voltage is now reversed across the capacitor 34 and it starts to discharge in the opposite direction. When the voltage at the junction of the capacitor 34 and resistor 36 reaches a logical high the output of the multivibrator goes to a logical low and this turns off the transistor 20' and deenergizes the flasher relay. This initiates the next cycle of the multivibrator and flasher circuit operation and the cycle repeats so long as the turn signal switch remains closed. When the turn signal switch is opened, the multivibrator is inhibited from oscillation by the inhibit gate 44'.

Although the invention has been described with reference to a particular embodiment it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

1. For use with a flasher circuit of the type comprising a voltage source, an electrically actuated switching means, a manually actuated switching means, a load device, both of said switching means and said load device being connected in a series circuit across the voltage source, said electrically actuated switching means being adapted for intermittent actuation under the control of periodic control signal from an oscillator when said manually actuated switching means is closed, whereby an intermittent voltage is applied across the load device, the improvement wherein said oscillator is a free running multivibrator having an output and an input and being adapted to produce a periodic control signal at said output when an enabling signal is applied to said input, said improvement further comprising enabling means having first and second inputs and an output, the first input of the enabling means being connected with said series circuit to sense the voltage across the load device, the second input of the enabling means being connected with the output of said oscillator, the output of the enabling means being connected with the input of the multivibrator, said enabling means being adapted to produce an enabling signal when the first and second input signals are in a predetermined state relative to each other whereby the multivibrator is caused to run so long as said manually actuated switch is closed.

2. The invention as defined in claim 1 wherein said multivibrator comprises first and second logic gates intercoupled by time constant means, and said enabling means is a logic gate.

3. The invention as defined in claim 2 wherein each of said logic gates has two inputs and an output, the outtput of the first logic gate is connected to a first input of the second logic gate, said time constant circuit includes a resistor and capacitor in series connection between the output of the second logic gate and the output of the first logic gate, the junction of the resistor and capacitor being connected to a first input of the first logic gate, said output of the second logic gate being the output of the multivibrator, said input of the multivibrator being connected to the second inputs of said first and second logic gates.

4. The invention as defined in claim 3 wherein said logic gates are NAND gates.

5. The invention as defined in claim 3 wherein said logic gates are NOR gates.

6. For use with a flasher circuit in an automotive turn signal system, said system being of the type comprising a voltage source, a manually actuated turn signal switch, a flasher relay having an energizing coil and relay contacts, a load including at least one incandescent lamp, said turn signal switch, relay contacts and said load being connected in a series across the voltage source with the turn signal switch being intermediate the load and the relay contacts, said flasher relay being adapted for intermittent actuation under the control of a periodic control signal, the control signal being produced by an oscillator and being applied through a driver amplifier to said coil when said turn signal switch is closed whereby an intermittent voltage is applied across the load, the improvement wherein said oscillator is a free-running multivibrator having an output and an input and being adapted to produce a control signal at said output when an enabling signal is applied to said input, said multivibrator comprising first and second logic gates intercoupled by time constant means, said improvement further comprising enabling means in the form of a logic gate having first and second inputs and an output, said first input of the logic gate being connected to the junction of said relay contacts and said turn signal switch to sense the voltage across said load, the second input of the logic gate being connected with the output of said multivibrator, the output of the logic gate being connected with the input of the multivibrator, said logic gate being adapted to produce an enabling signal when the first and second input signals are in a predetermined state relative to each other whereby the multivibrator is caused to run so long as said turn signal switch is closed.

7. The invention as defined in claim 6 wherein said logic gate of the enabling means is a NAND gate.

8. The invention as defined in claim 6 wherein said logic gate of the enabling means is a NOR gate.

9. The invention as defined in claim 6 wherein said driver transistor comprises a power transistor having an input and an output, an inverter gate having an input and an output, the input of the inverter gate being connected with the output of said multivibrator and the output of the inverter gate being connected with the input of said power transistor, the output of said power transistor being adapted for connection with the coil of said flasher relay across said voltage source.

10. The invention as defined in claim 6 including first and second voltage divider resistors adapted to be serially connected between the ungrounded terminal of said voltage source and said junction, said first input of the logic gate of the enabling means being connected with the junction of said voltage divider resistors, the resistor which is electrically closer to said ungrounded terminal having a resistance value several times greater than the resistance value of the other resistor and said load.

* * * * *